(12) United States Patent
Pan et al.

(10) Patent No.: US 7,799,872 B2
(45) Date of Patent: Sep. 21, 2010

(54) HYDROGENATION OF DIENE-BASED POLYMER LATEX

(75) Inventors: Qinmin Pan, Waterloo (CA); Garry Rempel, Waterloo (CA); Zhenli Wei, Qingdao (CN)

(73) Assignee: LANXESS Inc., Sarnia, Ontario (CA)

( * ) Notice: Subject to any disclaimer, the term of this patent is extended or adjusted under 35 U.S.C. 154(b) by 118 days.

(21) Appl. No.: 12/335,978

(22) Filed: Dec. 16, 2008

(65) Prior Publication Data

US 2009/0281248 A1 Nov. 12, 2009

(30) Foreign Application Priority Data

Dec. 17, 2007 (EP) .................... 07123385

(51) Int. Cl.
*C08F 8/04* (2006.01)
(52) U.S. Cl. .................. 525/339; 525/331.9; 525/332.8; 525/332.9; 525/333.1; 525/333.2; 525/338
(58) Field of Classification Search .................. 525/338, 525/339
See application file for complete search history.

(56) References Cited

U.S. PATENT DOCUMENTS

| | | | |
|---|---|---|---|
| 3,454,644 A | 7/1969 | Dewhirst ................. | 260/570.9 |
| 4,452,950 A | 6/1984 | Wideman .................. | 525/339 |
| 4,517,390 A * | 5/1985 | Russell et al. .............. | 568/881 |
| 4,631,315 A | 12/1986 | Buding et al. ............... | 525/338 |
| 5,021,649 A | 6/1991 | Nishimura et al. ..... | 250/231.16 |
| 5,039,737 A | 8/1991 | Parker et al. ................ | 524/804 |
| 5,057,581 A | 10/1991 | Rempel et al. ............. | 525/338 |
| 5,087,676 A | 2/1992 | Heider et al. ................. | 526/93 |
| 5,272,202 A | 12/1993 | Kubo et al. ................. | 524/565 |
| 5,340,858 A | 8/1994 | Bauer et al. ................. | 524/162 |
| 5,340,859 A | 8/1994 | Aydin et al. ................. | 524/162 |
| 5,350,787 A | 9/1994 | Aydin et al. ................. | 524/162 |
| 5,352,720 A | 10/1994 | Aydin et al. ................. | 524/162 |
| 5,414,193 A | 5/1995 | Taylor et al. ................ | 585/833 |
| 5,426,146 A | 6/1995 | Aydin et al. ................. | 524/458 |
| 5,442,009 A | 8/1995 | Parker et al. ................ | 524/555 |
| 5,576,384 A | 11/1996 | Nolken et al. ............... | 524/806 |
| 5,705,571 A | 1/1998 | Tsiang et al. ............... | 525/338 |
| 5,756,574 A | 5/1998 | Baumstark et al. .......... | 524/460 |
| 5,994,457 A | 11/1999 | Stanger et al. .............. | 524/800 |
| 6,020,439 A | 2/2000 | Ko et al. ..................... | 525/338 |
| 6,403,727 B1 | 6/2002 | Leube et al. ................ | 525/338 |
| 6,410,657 B1 | 6/2002 | Ko et al. ..................... | 525/338 |
| 6,552,132 B2 | 4/2003 | Belt et al. ................... | 525/338 |
| 6,566,457 B2 | 5/2003 | Barghoorn et al. .......... | 525/339 |
| 6,635,718 B2 | 10/2003 | Belt et al. ................. | 525/329.3 |
| 6,696,518 B1 | 2/2004 | Dersch et al. ............... | 524/560 |
| 7,385,010 B2 * | 6/2008 | Rempel et al. .............. | 525/338 |
| 7,696,282 B2 * | 4/2010 | Weiss et al. ................. | 525/338 |
| 2003/0088035 A1 | 5/2003 | Guerin et al. ............... | 525/509 |
| 2003/0096913 A1 | 5/2003 | Guerin ....................... | 525/238 |
| 2004/0242800 A1 | 12/2004 | Takahashi et al. ........... | 525/338 |
| 2006/0211827 A1 | 9/2006 | Rempel et al. ........... | 525/329.1 |

FOREIGN PATENT DOCUMENTS

| | | |
|---|---|---|
| EP | 1 705 194 | 9/2006 |
| EP | 1 721 910 | 11/2006 |
| JP | 2001288212 | 10/2001 |
| JP | 2003126698 | 5/2003 |

OTHER PUBLICATIONS

Applied Catalysis A-General, vol. 276, No. 1-2, 2004, pp. 123-128, Lin, Pan, Rempel "Hydro-genation of nitrile-butadiene rubber latex with diimide".
Journal of Applied Polymer Science, vol. 96. No. 4, 2005, pp. 1122-1125, Lin, Pan Rempel "Gel Formation in Diimide-Hydrogenated Polymers".
Journal of Applied Polymer Science, vol. 65. No. 4, 1997, pp. 667-675, Guo, Rempel "Catalytic Hydrogenation of Nitrile-Butadiene Copolymer Emulsion".
Journal of Molecular Catalysis A: Chemical, vol. 123, No. 1, 1997, pp. 15-20, Mudalige, Rempel "Aqueous-phase hydrogenation of polybutadiene, styrene-butadiene, and nitrile-butadiene polymer emulsions catalyzed by water-soluble rhodium complexes".
Rubber Chemistry and Technology, vol. 68, No. 2, 1995, 281-286, Singha and Sivaram, "A New Method to Hydrogenate Nitrile Rubber in the Latex Form".
Journal of Molecular Catalysis A Chemical, vol. 231, No. 1-2, 2005, 93-101, Vasilis Kotzabasakis et al, "Catalytic conversions in aqueous media: a novel and efficient hydrogenation of polybutadiene-1,4-*block*-poly(ethylene oxide) catalyzed by Rh/TPPTS complexes in mixed micellar nanoreactors".
Ullmann's Encyclopedia of Ind. Chem. 5$^{th}$ Ed., vol. A21 pp. 373-393, (no Author), "Polymerization Processes".
Houben-Weyl, Methoden der organischen Chemie, vol. XIV/1, Makromolekulare Stoffe, Georg Thieme Verlag, Stuttgard, 1961, 192-208, H. Logemann, "Allgemeines zur Polymerization in Hetrogener Phase".

* cited by examiner

*Primary Examiner*—Bernard Lipman
(74) *Attorney, Agent, or Firm*—Jennifer R. Seng

(57) ABSTRACT

The present invention relates to a process for the hydrogenation of the carbon-carbon double bonds in a diene-based polymer latex in the absence of any organic solvent by a catalytically active system prepared in-situ based on a first main catalyst component and a secondary water-insoluble catalyst component.

31 Claims, No Drawings

HYDROGENATION OF DIENE-BASED POLYMER LATEX

FIELD OF THE INVENTION

The present invention relates to a process for the selective hydrogenation of the carbon-carbon double bonds in diene-based polymers which are present in latex form in the absence of any organic solvent and by using group VIII noble metal-based catalysts.

BACKGROUND OF THE INVENTION

It is known that carbon-carbon double bonds in polymers may be successfully hydrogenated by treating the polymer in an organic solution with hydrogen in the presence of a catalyst. Such processes can be selective in the double bonds which are hydrogenated so that, for example, the double bonds in aromatic or naphthenic groups are not hydrogenated and double or triple bonds between carbon and other atoms such as nitrogen or oxygen are not affected. This field of art contains many examples of catalysts suitable for such hydrogenations, including catalysts based on cobalt, nickel, rhodium, ruthenium, osmium, and palladium. The suitability of the catalyst depends on the extent of hydrogenation required, the rate of the hydrogenation reaction and the presence or absence of other groups, such as carboxyl and nitrile groups, in the polymers. There have been already many patents and patent applications filed in this area, such as U.S. Pat. No. 6,410,657, U.S. Pat. No. 6,020,439, U.S. Pat. No. 5,705,571, U.S. Pat. No. 5,057,581, and U.S. Pat. No. 3,454,644.

However, many diene-based polymers, -copolymers or -terpolymers are made by emulsion polymerization processes and they are in latex form when they are discharged from polymerization reactors. Therefore it is very desirable to directly hydrogenate a diene-based polymer in latex form and this approach is receiving increasing attention in the recent decade. Many efforts have been made to realize such a process.

So far significant attention has been paid to the hydrogenation of C=C bonds using hydrazine or a derivative of hydrazine as a reducing agent together with an oxidant like oxygen, air or hydrogenperoxide. The hydrogen source to saturate the C=C bonds is then generated in-situ as a result of the redox reactions in which diimide is also formed as intermediate.

In U.S. Pat. No. 4,452,950 the latex hydrogenation is performed using the hydrazine hydrate/hydrogen peroxide (or oxygen) redox system to produce diimide in situ. $CuSO_4$ or $FeSO_4$ is used as a catalyst.

U.S. Pat. No. 5,039,737, and U.S. Pat. No. 5,442,009 provide a more refined latex hydrogenation process which treats the hydrogenated latex with ozone to break the cross-linked polymer chains which form during or after the latex hydrogenation using the diimide approach.

U.S. Pat. No. 6,552,132 discloses that a compound can be added before, during or after the latex hydrogenation to break crosslinks formed during the hydrogenation using the diimide hydrogenation route. The compound can be chosen from primary or secondary amines, hydroxylamine, imines, azines, hydrazones and oximes.

U.S. Pat. No. 6,635,718 describes the process for hydrogenating C=C bonds of an unsaturated polymer in the form of an aqueous dispersion by using hydrazine and an oxidizing compound in the presence of a metal compound containing a metal atom in an oxidation state of at least 4 (such as Ti(IV), V(V), Mo(VI) and W(VI)) as the catalyst.

In Applied Catalysis A-General Vol. 276, no. 1-2, 2004, 123-128 and Journal of Applied Polymer Science Vol. 96, no. 4, 2005, 1122-1125 detailed investigations relating to the hydrogenation of nitrile butadiene rubber latex via utilization of the diimide hydrogenation route are presented which cover examining hydrogenation efficiency and degree of hydrogenation. It has been found that there are side reactions at the interphase of the latex particles and within the polymer phase, which generate radicals to initiate the crosslinking of polymers in the latex form. Using radical scavengers did not show any evidence in helping to suppress the degree of gel formation.

Although there are methods developed to reduce the crosslinking, the aforementioned diimide route still encounters gel formation problem, especially when high hydrogenation conversion is achieved. Therefore, the resulting hydrogenated rubber mass is difficult to process or is unsuitable for further use because of its macroscopic three dimensional cross-linked structure.

U.S. Pat. No. 5,272,202 describes a process for the selective hydrogenation of the carbon-carbon double bonds of an unsaturated, nitrile-group-containing polymer with hydrogen in the presence of a hydrogenation catalyst being a palladium compound. In this process an aqueous emulsion of the unsaturated, nitrile-group-containing polymer is subjected to the hydrogenation and additionally an organic solvent capable of dissolving or swelling the polymer is used at a volume ratio of the aqueous emulsion to the organic solvent in a range of from 1:1 to 1:0.05. The aqueous emulsion is brought into contact with gaseous or dissolved hydrogen while maintaining an emulsified state.

U.S. Pat. No. 6,403,727 discloses a process for selectively hydrogenating C=C double bonds in polymers. Said process involves reacting the polymers with hydrogen in the presence of at least one hydrogenation catalyst selected from the salts and complex compounds of rhodium and/or ruthenium in an aqueous dispersion of the polymers which comprises up to 20% by volume of an organic solvent. The suitable rhodium containing catalysts are rhodium phosphine complexes of the formula $Rh\ X_m L^3 L^4 (L^5)_n$ wherein X is a halide, the anion of a carboxylic acid, acetylacetonate, aryl- or alkylsulfonate, hydride or the diphenyltriazine anion and $L^3$, $L^4$ and $L^5$ independently are CO, olefins, cycloolefins, dibenzophosphol, benzonitrile, $PR_3$ or $R_2P-A-PR_2$, m is 1 or 2 and n is 0, 1 or 2, with the proviso that at least one of $L^3$, $L^4$ or $L^5$ is one of the above mentioned phosphorus-containing ligands of the formula $PR_3$ or $PR_2-A-PR_2$, wherein R is alkyl, alkyloxy, cycloalkyl, cycloalkyloxy, aryl or aryloxy. U.S. Pat. No. 6,566,457 makes use of the same principal technology of hydrogenating a polymer in latex form in the presence of a ruthenium and/or rhodium containing catalyst in order to prepare graft polymers.

JP 2001-288212 A describes a further process for hydrogenating diene-based polymer latices. Latices of 2-chloro-1,3-butadiene (co)polymers are mixed with solutions or dispersions of catalysts in organic solvents which dissolve or swell the (co)polymers, and are then contacted with hydrogen. The catalysts used are the so-called Wilkinson-catalysts having the formula $MeCl_a(P(C_6H_5)_3)_b$ wherein Me is a transition-metal, Cl is chlorine, b is an integer and equal to or bigger than 1 and a+b is an integer less than or equal to 6. In the Examples a latex of poly(2-chloro-1,3-butadiene) rubber having a $T_g$ of −42° C. and an average number weight molecular weight Mn of 150.000 was added to a toluene solution containing $RhCl(PPh_3)_3$ and $Ph_3P$, and hydrogenated at 100° C. and 5.0 MPa for 2 hours to give a hydrogenated polymer with Tg−54° C. and Mn=120.000.

In the Journal of Applied Polymer Science, Vol. 65, no. 4, 1997, 667-675, two processes for the selective hydrogenation of the C=C bonds in nitrile-butadiene rubber ("NBR") emulsions are described, which are carried out in the presence of a number of $RuCl_2(PPh_3)_3$ complex catalysts. One of the processes is carried out in a homogeneous system, in which an organic solvent, which can dissolve the NBR polymer and the catalyst and which is compatible with the emulsion, is used. The other process is carried out in a heterogeneous system, in which an organic solvent, which is capable of dissolving the catalyst and swelling the polymer particles but is not miscible with the aqueous emulsion phase, is used. Both processes can realize quantitative hydrogenation of the C=C double bonds with the help of a certain amount of organic solvent to dissolve or swell the polymers.

U.S. Pat. No. 6,696,518 teaches a process for selective hydrogenation of nonaromatic C=C and C≡C bonds in polymers with hydrogen in the presence of at least one hydrogenation catalyst comprising ruthenium and/or rhodium and at least one nonionic phosphorus compound capable of forming a coordinative compound with the transition metal wherein the hydrogenation catalyst is incorporated into the aqueous dispersion of the polymer without adding a solvent. Ru and/or Ru complexes or Ru and/or Ru salts are used as catalysts. Examples of preferred nonionic phosphorus compound are $PR_3$ or $R_2P(O)_xZ(O)_yPR_2$ [R represents e.g. $C_{1-10}$ alkyl, $C_{4-12}$ cycloalkyl, $C_{1-10}$ alkoxy, aryl(oxy) and F; Z is a bivalent hydrocarbon residue; x, y=0, 1]. For this special case, an acrylic acid-butadiene-styrene copolymer latex was prepared by radical polymerization of a mixture of monomers containing also ruthenium(III) tris-2,4-pentanedionate, which means the Ru salt was dispersed into monomer aqueous solution as the catalyst precursor before the polymerization. After having obtained the aqueous polymer dispersion, $Bu_3P$ was added to the latex. The system was stirred for 16 h at ambient temperature followed by hydrogenation at severe conditions for 30 hours at 150° C. and 280 bar. The catalyst was thereby synthesized in-situ, therefore no organic solvent was used to transport the catalyst. The hydrogenation is carried out in aqueous dispersions instead of in an organic medium, although the in-situ synthesized catalyst is oil-soluble. However, the operating procedure of U.S. Pat. No. 6,696,518, i.e. adding the catalyst precursor to the monomer mixture before the polymerization takes place, is associated with some problems, including that the catalyst precursor may have a negative effect on the polymerization and that some of the catalyst precursor might get deactivated during the polymerization.

In J. Molecular Catalysis Vol. 123, no. 1, 1997, 15-20 it is reported on the hydrogenation of polybutadiene (PBD), as well as polymers having styrene-butadiene repeating units (SBR) or having nitrile-butadiene repeating units (NBR) which are present in emulsions. Such hydrogenation is catalyzed by water-soluble rhodium complexes like e.g. [RhCl (HEXNa)$_2$]$_2$ (HEXNa=Ph$_2$P—(CH$_2$)$_5$—CO$_2$Na) and RhCl (TPPMS)$_3$ (TPPMS=monosulphonated-triphenylphosphine). The process, however, is carried out in the presence of some organic solvent. Under the conditions employed the catalyst is extracted into the organic phase during reaction. This is attributed to the phase transfer properties of the complex which is rendered by the amphiphilic HEXNa ligand.

In Rubber Chemistry and Technology Vol. 68, no. 2, 1995, 281-286 it is described to use a water-soluble analog of the Wilkinson catalyst, i.e. RhCl(TPPMS)$_3$ (where TPPMS represents monosulphonated-triphenylphosphine), for hydrogenation of nitrile rubber latex without any organic solvent. The hydrogenation occurs under mild conditions (1 atm of hydrogen pressure, 75° C.) without coagulation of the latex, and up to 60 percent hydrogenation can be achieved. It is recognized that the hydrogenation was accompanied by an increase in gel content of the latex.

JP 2003-126698 A discloses a process for hydrogenating unsaturated polymer latices using a water soluble catalyst containing group VIII metals or their compounds and hydrophilic organic phosphine ligands in the absence of organic solvents. In the process as disclosed in the Examples, 0.133 mmol (as Rh) chloro(1,5-cyclooctadiene)rhodium dimer was stirred with 0.372 mmol of $P(C_6H_4SO_3Na)_3$ to generate an aqueous solution of the complex catalyst. One part of such catalyst solution was mixed with five parts of butadiene rubber latex without organic solvent for hydrogenation. However, the highest degree of hydrogenation is only about 56% which is unsatisfactory for a scale-up to larger production volumes.

In the Journal of Molecular Catalysis, A: Chemical, Vol 231, no. 1-2, 2005, 93-101 it is reported to perform an aqueous phase hydrogenation of polybutadiene-1,4-block-poly (ethylene oxide) (PB-b-PEO) by using water-soluble Rh/TPPTS complexes. The hydrogenation can be successful only because the PB-b-PEO has water-soluble parts within its polymer chains. In such a hydrogenation system, mixed micelles are formed by mixing the amphiphilic PB-b-PEO with added cationic surfactant dodecyl trimethyl ammonium chloride (DTAC) and n-hexane. Hydrogenation conversion can go up to 100% after one hour catalyzed by Rh/TPPTS complexes ([Rh]=10 ppm or less in aqueous phase) generated in situ from $RhCl_3 3H_2O$ and TPPTS under 80 to 100° C. and 20 bar of $H_2$. Their recycling experiment showed that the catalytic activity of the anionic catalytic system, $Rh/P(C_6H_4\text{-}m\text{-}SO_3\text{—})_3$, remained high in a consecutive run. The success of this hydrogenation system is mainly due to the fact that PB-b-PEO is an amphiphilic starting material. Therefore, the water-soluble catalyst works for systems which use an amphiphilic polymer material.

In US 2006/0211827 A1 a process for selectively hydrogenating nitrile-butadiene rubber latex without organic solvent is disclosed in which $RhCl(PPh_3)_3$ is used as catalyst and $PPh_3$ is used as co-catalyst. The catalyst is added as pure material or in a small amount of organic solvent. This process can achieve high degrees of hydrogenation and does not show gel formation. However, this method requires long reaction times and high loading of the transition metal for synthesis of the catalyst.

In summary, several technical routes have been attempted to hydrogenate C=C double bonds in polymers in the form of latex, which include using hydrazine or a derivative of hydrazine as a reducing agent together with an oxidant like oxygen, air or hydroperoxide, directly using oil-soluble catalysts accompanied with a certain amount of organic solvents, and using catalysts containing water-soluble ligands. The hydrazine relevant route has encountered a significant gel formation problem, especially when a high hydrogenation conversion is required, and gel formation is not desired for post processing operations. In all the prior art references relevant to using oil-soluble catalysts, a certain amount of organic solvent is still required in order to achieve a reasonable hydrogenation rate. The route using water-soluble catalysts has also encountered significant difficulty in overcoming the crosslinking problem.

The present invention therefore had the object to provide a novel and improved process allowing the hydrogenation of a diene-based polymer present as an aqueous dispersion, i.e. as a latex, with a high degree of hydrogenation within short reaction times. The improved process shall eliminate the complicated catalyst synthesis operations so far necessary.

SUMMARY OF THE INVENTION

The present invention provides a process for selectively hydrogenating carbon-carbon double bonds in a diene-based polymer comprising subjecting the diene-based polymer which is present in latex form to a hydrogenation which is performed in the absence of any organic solvent and by con tacting it with a catalytically active system based on a first main catalyst component having the general formula (I)

$$MQ_x \cdot aH_2O \qquad (I)$$

wherein

M is a group VIII transition noble metal, preferably rhodium, ruthenium, osmium or iridium, Q is identical or different, and a hydride or an anion other than a hydride, x is 1, 2, or 3, and a is in the range of from 0 to 3 and on a secondary water-insoluble catalyst component having either the general formula (II) or the general formula (III)

$$R^1{}_m B \qquad (II)$$

$$R^2{}_2 C\text{-}A\text{-}CR^2{}_2 \qquad (III)$$

in which $R^1$ is identical or different and represents hydrogen, alkyl, preferably $C_1$-$C_8$-alkyl, aryl, preferably $C_6$-$C_{15}$-aryl, cycloalkyl, preferably $C_4$-$C_8$-cycloalkyl, or aralkyl, preferably $C_7$-$C_{15}$-aralkyl, B is phosphorus, nitrogen, arsenic, sulfur, or a sulphoxide group S=O, and m is 2 or 3, $R^2$ is identical or different and represents hydrogen, alkyl, preferably $C_1$-$C_8$-alkyl, aryl, preferably $C_6$-$C_{15}$-aryl, cycloalkyl, preferably $C_4$-$C_8$-cycloalkyl or aralkyl, preferably $C_7$-$C_{15}$-aralkyl, C is phosphorus, or arsenic, A represents either a single bond or a spacer group, preferably phenylene or a —(CH$_2$)$_n$— group with n being an integer from 1 to 20 and wherein such catalytically active system is prepared in-situ.

DETAILED DESCRIPTION OF THE INVENTION

The process of the present invention allows a selective hydrogenation of the carbon-carbon double bonds which are present in a diene-base-d polymer. This means that, for example, the double bonds in aromatic or naphthenic groups are not hydrogenated and double or triple bonds between carbon and other atoms such as nitrogen or oxygen are also not affected. The improved process eliminates the complicated catalyst synthesis operations so far necessary.

The combination of using a catalytically active system which is prepared in-situ with the feature that the hydrogenation is performed in the absence of any organic solvent is important for the successful performance of the present invention.

In the context of this application the term "in situ" shall mean that the catalytically active system is either formed (i) by contacting the first main catalyst component having the general formula (I) with the secondary water-insoluble catalyst component having either the general formula (II) or (III) beforehand in an aqueous solution and then without isolating the catalytically active species contacting such catalytically active solution with the diene-based polymer to be hydrogenated and present in latex form or (ii) by adding and thereby contacting the first main catalyst component having the general formula (I) with the secondary water-insoluble catalyst component having either the general formula (II) or (III) directly in the latex containing the diene-based polymer to be hydrogenated.

In one embodiment of the present invention the secondary water-insoluble catalyst component has the general formula (II) wherein $R^1$ is identical or different and represents hydrogen, $C_1$-$C_8$-alkyl, $C_6$-$C_{15}$-aryl, $C_4$-$C_8$-cycloalkyl or $C_7$-$C_{15}$-aralkyl, B is phosphorus or nitrogen, m is 3, or the secondary water-insoluble catalyst component has the general formula (III) wherein $R^2$ is identical or different and represents hydrogen, $C_1$-$C_8$-alkyl, $C_6$-$C_{15}$-aryl, $C_4$-$C_8$-cycloalkyl, or $C_7$-$C_{15}$-aralkyl, and A represents 1,4-phenylene or a $C_1$-$C_8$-alkylene group or a single bond.

Suitable secondary water-insoluble catalyst components pursuant to general formula (II) are triaryl-, trialkyl-, tricycloalkyl-, diaryl monoalkyl-, dialkyl monoaryl-, diaryl monocycloalkyl-, dialkyl monocycloalkyl-, dicycloalkyl monoaryl- or dicycloalkyl monoaryl phosphines.

Examples of secondary water-insoluble catalyst components pursuant to general formula (II) are also given in U.S. Pat. No. 4,631,315, the disclosure of which is incorporated by reference as far as allowed by the respective jurisdiction. The most preferred secondary water-insoluble catalyst component pursuant to general formula (II) is triphenylphosphine.

In the context of this application a catalyst component or catalyst is considered as "water-insoluble" if 0.001 or less parts by weight can be completely dissolved in 100 parts by weight of water at 24+/−2° C., while a catalyst or catalyst component is considered as "water-soluble" if 0.5 or more parts by weight can be completely dissolved in 100 parts by weight of water at 24+/2° C.

In a preferred embodiment a catalytically active system on the basis of the following secondary water-insoluble catalyst component pursuant to the general formula (II) is used, wherein $R^1$ is hydrogen, cyclohexyl or phenyl, B is P or N, and m is 3.

In the first main catalyst component pursuant to the general formula (I) M preferably represents rhodium, ruthenium, osmium or iridium, Q preferably represents hydrogen or a halide, more preferably a chloride or bromide ion and x is 1, 2, or 3, in particular 3, when Q is a halide and a is the average number of $H_2O$ molecules of hydration associated with $MQ_x$, which is in the range of from 0 to 3 and which may represent an integer or a non-integer.

The in-situ preparation of the catalytically active system may result in e.g. the following catalytically active species: tris-(triphenylphosphine)-rhodium(I)-chloride, tris-(triphenyl-phosphine)-rhodium(III)-trichloride, tris-(dimethylsulphoxide)rhodium(III)-trichloride, tetrakis-(triphenylphosphine)-rhodium(I) hydride, and the corresponding compounds in which triphenyl-phosphine moieties are replaced by tricyclohexylphosphine. In an alternative embodiment OsHCl(CO)(PCy$_3$)$_2$ or OsHCl(CO)[P(isopropyl)$_3$]$_2$ are used as catalysts to be prepared in-situ in accordance with the present invention.

In a particularly preferred embodiment the catalytically active system is based on RhCl$_3$.3H$_2$O as first main catalyst component and PPh$_3$ as secondary catalyst component.

The first main catalyst component can generally be used in small quantities for the in-situ preparation of the catalyst. Typically the first main catalyst component is used in an amount in the range of from 0.01% b.w. to 5.0% b.w., preferably of from 0.2% b.w. to 2.0% b.w. based on the weight of the polymer solid content of the latex.

To prepare the catalytically active system the secondary catalyst component can generally be used in quantities in the range of from 0.1% b.w. to 50% b.w., preferably of from 0.2% b.w. to 20% b.w. based on the weight of the polymer solid content of the latex.

Suitable substrates for the hydrogenation process of the present invention are in principle all aqueous dispersions of polymers having ethylenically unsaturated double bonds, which are also called "latex". These include both dispersions prepared by free-radical polymerization of aqueous monomer emulsions (primary dispersions) and those whose polymers are prepared by another route and are then converted to an aqueous dispersion form (secondary dispersions). The term polymer dispersion also embraces, in principle, dispersions of microcapsules.

Polymers having carbon-carbon double bonds which may be subjected to the inventive process comprise repeating units based on at least one conjugated diene monomer.

The conjugated diene can be of any nature. In one embodiment ($C_4$-$C_6$) conjugated dienes are used. Preference is given to 1,3-butadiene, isoprene, 1-methylbutadiene, 2,3-dimethylbutadiene, piperylene, chloroprene, or mixtures thereof. Particular preference is given to 1,3-butadiene and isoprene or mixtures thereof. Especial preference is given to 1,3-butadiene.

In a further embodiment polymers having carbon-carbon double bonds may be subjected to the inventive process which comprise repeating units of at least one conjugated diene as monomer (a) and at least one further copolymerizable monomer (b).

Examples of suitable monomers (b) are olefins, such as ethylene or propylene.

Further examples of suitable monomers (b) are vinylaromatic monomers, such as styrene, alpha-methyl styrene, o-chlorostyrene or vinyltoluenes, vinylesters of aliphatic or branched $C_1$-$C_{18}$ monocarboxylic acids, such as vinyl acetate, vinyl propionate, vinyl butyrate, vinyl valerate, vinyl hexanoate, vinyl 2-ethylhexanoate, vinyl decanoate, vinyl laurate and vinyl stearate.

A preferred polymer to be used in the present invention is a copolymer of 1,3-butadiene and styrene or alpha-methylstyrene. Said copolymers may have a random or block type structure.

Further examples of suitable monomers (b) are ethylenically unsaturated mono- or dicarboxylic acids such as acrylic acid, methacrylic acid, maleic acid, fumaric acid and itaconic acid as well as esters of ethylenically unsaturated mono- or dicarboxylic acids such as acrylic acid, methacrylic acid, maleic acid, fumaric acid and itaconic acid with generally $C_1$-$C_{12}$ alkanols, such as methanol, ethanol, n-propanol, isopropanol, 1-butanol, 2-butanol, isobutanol, tert-butanol, n-hexanol, 2-ethylhexanol, or $C_5$-$C_{10}$ cycloalkanols, such as cyclopentanol or cyclohexanol, and of these preferably the esters of acrylic and/or methacrylic acid, examples being methyl methacrylate, n-butyl methacrylate, tert-butyl methacrylate, n-butyl acrylate, tert-butyl acrylate, and 2-ethylhexyl acrylate.

Suitable further copolymerizable monomers (b) are α,β-unsaturated nitriles. It is possible to use any known α,β-unsaturated nitrile, preferably a ($C_3$-$C_5$) α,β-unsaturated nitrile such as acrylonitrile, methacrylonitrile, ethacrylonitrile or mixtures thereof. Particular preference is given to acrylonitrile.

A particularly suitable copolymer to be used in the present invention is a nitrile rubber (also abbreviated as "NBR") this being a copolymer of an α,β-unsaturated nitrile, particularly preferred acrylonitrile, and a conjugated diene, particularly preferred 1,3-butadiene and optionally one or more further copolymerizable monomers, such as α,β-unsaturated monocarboxylic or dicarboxylic acids, their esters or amides.

As α,β-unsaturated monocarboxylic or dicarboxylic acids in such nitrile rubbers preference is given to fumaric acid, maleic acid, acrylic acid and methacrylic acid.

As esters of α,β-unsaturated carboxylic acids in such nitrile rubbers preference is given to using their alkyl esters and alkoxyalkyl esters. Particularly preferred alkyl esters of α,β-unsaturated carboxylic acids are methyl acrylate, ethyl acrylate, propyl acrylate, n-butyl acrylate, tert-butyl acrylate, propyl methacrylate, n-butyl methacrylate, tert-butyl methacrylate, 2-ethylhexyl acrylate, 2-ethylhexyl methacrylate and octyl acrylate. Particularly preferred alkoxyalkyl esters of α,β-unsaturated carboxylic acids are methoxyethyl (meth) acrylate, ethoxyethyl (meth)acrylate and methoxyethyl (meth)acrylate. It is also possible to use mixtures of alkyl esters, e.g. those mentioned above, with alkoxyalkyl esters, e.g. in the form of those mentioned above.

A preferred terpolymer to be used in the present invention is a terpolymer of acrylonitrile, 1,3-butadiene and a third monomer selected from the group consisting of fumaric acid, maleic acid, acrylic acid, methacrylic acid, n-butyl acrylate and tert-butyl acrylate.

In case that the polymer to be subjected to hydrogenation comprises not only repeating units of one or more conjugated dienes, but also repeating units of one or more further copolymerizable monomers, the proportions of conjugated diene(s) and the other copolymerizable monomers may vary within wide ranges:

In case of NBR polymers being used for hydrogenation the proportion of or of the sum of the conjugated dienes is usually in the range from 40 to 90% by weight, preferably in the range from 50 to 85% by weight, based on the total polymer. The proportion of or of the sum of the α,β-unsaturated nitrites is usually from 10 to 60% by weight, preferably from 15 to 50% by weight, based on the total polymer. The proportions of the monomers in each case add up to 100% by weight. Additional termonomers may optionally be present. If used, they are typically present in amounts of from greater than 0 to 40% by weight, preferably from 0.1 to 40% by weight, particularly preferably from 1 to 30% by weight, based on the total polymer. In this case, corresponding proportions of the conjugated diene(s) and/or of the α,β-unsaturated nitrile(s) are replaced by the proportions of the additional termonomers, with the proportions of all monomers in each case adding up to 100% by weight.

The preparation of nitrile rubbers by polymerization of the abovementioned monomers is adequately known to those skilled in the art and is comprehensively described in the polymer literature.

Nitrile rubbers which can be used for the purposes of the invention are also commercially available, e.g. as products from the product range of the trade names Perbunan® and Krynac® from Lanxess Deutschland GmbH.

In another embodiment of the invention it is possible to use nitrile rubbers which have been subjected to a metathesis reaction in order to decrease their molecular weight. Such metathesis reaction is known in the art and e.g. disclosed in WO-A-02/100905 and WO-A-02/100941.

The nitrile rubbers which may be used pursuant to this invention have a Mooney viscosity (ML 1+4 at 100° C.) in the range of from 3 to 75, preferably 5 to 75, more preferably 20 to 75, even more preferably 25 to 70, and particularly preferred from 30 to 50. The weight average molecular weight $M_w$ lies in the range of from 25.000-500.000, preferably in the range of from 200.000-500.000, more preferably in the range 200.000-400.000. A nitrile rubber having a Mooney viscosity of e.g. about 34 has an intrinsic viscosity, determined in chlorobenzene at 35° C., of about 1.1 dL/g. The nitrile rubbers used also have a polydispersity PDI=$M_w/M_n$, where $M_w$ is the weight average molecular weight and $M_n$ is the number average molecular weight, in the range of from 1.5 to 6.0, preferably of from 1.8 to 6.0, more preferably of from 1.9 to 6.0 and even more preferably in the range of from 2.0 to 4.0. The determination of the Mooney viscosity is carried out in accordance with ASTM standard D 1646.

If a polymer other than a nitrile rubber is used in the present invention which contains repeating units of one or more conjugated dienes and one or more other copolymerizable monomers like e.g. styrene or alpha-methylstyrene the proportion of the conjugated diene(s) is usually from 15 to less than 100% b.w. and the proportion of or of the sum of the copolymerizable monomer(s) is from greater than 0 to 85% b.w. with the proportion of all monomers in each case adding up to 100%. If styrene or alphamethyl styrene are used as other copolymerizable monomers, the proportion of styrene and/or a methyl styrene is preferably from 15 to 60% b.w., while the remainder to 100% b.w. is represented by the conjugated diene(s).

The carbon-carbon double bond containing polymer in the latex form useful in the present invention may be prepared by any method known to those skilled in the art, such as emulsion polymerization, solution polymerization or bulk polymerization. Preferably, the carbon-carbon double bond containing polymer useful in the present invention is prepared in an aqueous emulsion polymerization process as this process directly yields the latex form of the polymer.

Preferably, according to the present invention, the polymer solid content in the aqueous emulsion lies in the range of from 1 to 75% by weight, more preferably from 5 to 30% by weight based on the total weight of the aqueous emulsion.

The preparation of such polymers which are subjected to the process pursuant to this invention is known to the skilled worker and can in principle be carried out by anionic, free-radical or Ziegler-Natta polymerization in solution, in bulk, in suspension or in emulsion. Depending on the type of reaction, the conjugated dienes are 1,4- and/or 1,2 polymerized. For the hydrogenation process of the invention it is preferred to employ polymers prepared by free-radical aqueous emulsion polymerization of the above mentioned monomers (a) and (b). These techniques are sufficiently well known to the skilled worker and are described at length in the literature, for example in Ullmann's Encyclopedia of Industrial Chemistry, 5th Edition, Volume A 21, pp 373-393. In general such polymers are prepared in the presence of free-radical initiators and, if desired, surface-active substances such as emulsifiers and protective colloids (see for example Houben Weyl, Methoden der organischen Chemie, Volumen XIV/1, Makromolekulare Stoffe, Georg Thieme Verlag, Stuttgart, 1961, pp 192-208).

Suitable free-radical polymerization initiators include organic peroxides, such as tert-butyl hydroperoxide, benzoyl hydroperoxide, diisopropylbenzoyl peroxide, inorganic peroxides, such as hydrogen peroxide, salts of peroxomono and/or peroxodisulfuric acid, especially the ammonium and/or alkali metal peroxodisulfates (persulfates), and azo compounds, particular preference being given to the persulfates. Preference is also given to combined systems composed of at least one organic reducing agent and at least one peroxide and/or hydroperoxide, such as tert-butyl hydroperoxide and the sodium salt of hydroxymethanesulfonic acid, or hydrogen peroxide and ascorbic acid (as an electrolyte-free redox initiator system) and to combine systems which additionally comprise a small amount of a metal compound which is soluble in the polymerization medium and whose metallic component can exist in a plurality of valence states, for example ascorbic acid/iron(II) sulfate/hydrogen peroxide, it also being possible frequently to replace the ascorbic acid by the sodium salt of hydroxymethanesulfinic acid, sodium sulfite, sodium hydrogensulfite or sodium bisulfite and the hydrogen peroxide by tert-butyl hydroperoxid, alkali metal peroxodisulfates and/or ammonium peroxodisulfate. Instead of a water-soluble iron(II) salt it is also possible to employ a combination of water-soluble Fe/V salts.

These polymerization initiators are employed in customary amounts, such as in amounts of from 0.01% b.w. to 5% b.w., preferably from 0.1% b.w. to 2.0% b.w., based on the monomers to be polymerized.

The monomer mixtures can, if desired, be polymerized in the presence of customary regulators, such as mercaptans, an example of which is tert-dodecyl mercaptan manufactured by various companies including Lanxess Deutschland GmbH. These regulators are then used in an amount of from 0.01% b.w. to 5% b.w., based on the overall amount of the mixture.

There are no particular restrictions on the emulsifiers that can be used. Preference is given to neutral emulsifiers such as ethoxylated mono, di- and trialkylphenols (ethyleneoxide degree: 3 to 50; alkyl $C_4$ to $C_9$) or ethoxylated fatty alcohols (ethyleneoxide degree: 3 to 50; alkyl $C_4$ to $C_9$) and/or anionic emulsifiers, such as the alkali metal and ammonium salts of fatty acids (alkyl: $C_{12}$ to $C_{24}$), of alkyl sulfates (alkyl: $C_8$ to $C_{22}$), of sulfuric monoesters of ethoxylated alkanols (ethyleneoxide degree: 4 to 30, alkyl: $C_8$ to $C_{22}$) and of ethoxylated alkylphenols (ethyleneoxide degree: 3 to 50, alkyl: $C_4$ to $C_{20}$), of alkylsulfonic acids (alkyl: $C_8$ to $C_{22}$) and of alkylarylsulfonic acids (alkyl: $C_4$ to $C_{18}$). Further suitable anionic emulsifiers are alkali metal or ammonium salts of mono- or di-$C_{4-24}$ alkyl derivatives of bis(phenylsulfonic acid)ether.

Particular preference is given to the alkali metal and/or ammonium salts, especially the sodium salts, of alkylarylsulfonic acids, alkylsulfonic acids (e.g. sulfonated $C_{12}$-$C_{18}$ paraffin), alkylsulfates (e.g. sodium lauryl sulfonate) and of the sulphuric monoesters of ethoxylated alkanols (e.g. sulfoxylated ethoxylate of lauryl alcohol with 2 to 3 ethyleneoxide units). Further suitable emulsifiers are the sodium or potassium salts of fatty acids ($C_{12}$-$C_{23}$-alkyl radicals), such as potassium oleate. Additional appropriate emulsifiers are given in Houben-Weyl, loc. Cit., pp. 192-208. Instead of or in a mixture with emulsifiers it is also possible, however, to employ conventional protective colloids, such as polyvinyl alcohol, polyvinylpyrrolidone or amphiphilic block polymers with short hydrophobic blocks, for the purpose of co-stabilization. In general the amount of emulsifiers used, based on the monomers to be polymerized, will not exceed 5% by weight.

The free-radical polymerization reaction can be carried out by the whole-batch initial charge (batch) technique, but is preferably operated, especially on the industrial scale, in accordance with the feed technique. In this latter technique the major amount (generally from 50 to 100% by weight) of the monomers to be polymerized are added to the polymerization vessel in accordance with the progress of the polymerization of the monomers already in the polymerization vessel. In this context; the free-radical initiator system can be either included entirely in the initial charge to the polymerization vessel or else added continuously or in stages to the polymerization reaction at the rate at which it is consumed in the course of the free-radical aqueous emulsion polymerization. In each individual case this will depend, as is known, both on the chemical nature of the initiator system and on the polymerization temperature. The initiator system is preferably supplied to the polymerization zone at the rate at which it is consumed.

The polymerization reaction may also be conducted in the presence of an aqueous polymer dispersion as polymer (seed latex). Such techniques are fundamentally known to the skilled worker and are described for example, in DE-A 42 13 967, DE-A 42 13 968, EP-A-0 567 811, EP-A-0 567 812 or EP-A-0 567 819, which are incorporated fully herein by reference. In principle it is possible depending on the desired character, to include the seed in the initial charge or to add it continuously or in stages in the course of polymerization. The polymerization is preferably carried out with the seed in the initial charge. The amount of seed polymer is preferably in the range from 0.05 to 5% by weight, preferably from 0.1 to 2% by weight and, in particular, from 0.2 to 1% by weight, based on the monomers a) to d). The polymer particles of the seed latex that is used preferably have weight-average diameters in the range from 10 to 100 nm, preferably from 20 to 60 nm and in particular, about 30 nm. Preference is given to the use of a polystyrene seed.

The polymerization reaction is preferably carried out above atmospheric pressure. The polymerization time can vary within a wide range, and is generally from 1 to 15 hours, preferably from 3 to 10 hours. The temperature of polymerization is also variable a wide range and, depending on the initiator used, is from about 0 to 110° C.

The polymer dispersions prepared in this way generally have solid contents of up to 75% by weight. For use in the hydrogenation process of the invention it is possible to employ the dispersions with these solid contents. In some cases, however, it is advisable to dilute the dispersions to an appropriate solid content beforehand. The solid content of the dispersions employed is preferably in the range from 5 to 30% by weight, based on the overall weight of dispersion.

The surface-active substances still present, in general, in the polymer dispersions, and further substances used, for example, as customary polymerization auxiliaries in emulsion polymerizations, do not have a disruptive effect on the hydrogenation process of the invention. However, it is advisable to subject the polymer dispersions to chemical or physical deodorization before hydrogenation. Physical deodorization, by stripping the residual monomers with steam, is known, for example, from EP-A-0 584 458. EP-A-0 327 006 for its part recommends the use of conventional distillation methods. Chemical deodorization takes place preferably by means of a post polymerization following the main polymerization. Such processes are described, for example, in DE-A 383 4734, EP-A-0 379 892, EP-A-0 327 006, DE-A 44 19 518, DE-A 44 35 422 and DE-A 44 35 423.

The hydrogenation process of the present invention may optionally be carried out in the presence of ammonium salts like e.g. cetyl trimethyl ammonium bromide (CTAB).

The hydrogenation process of the present invention is preferably carried out with hydrogen gas at a pressure of from 0.1 to 20 MPa, preferably at a pressure of from 1 to 16 MPa. In one embodiment of the present process said hydrogen gas is essentially pure.

The process of the present invention can be undertaken in a suitable reactor equipped with temperature regulating and agitating means.

In one embodiment of the present invention the polymer latex, i.e. the aqueous dispersion of the diene-based polymer to be hydrogenated, is fed into the reactor and degassed as required, and the first main catalyst component of general formula (I) as well as the secondary water-insoluble catalyst component having either the general formula (II) or the general formula (III) are added to such aqueous dispersion. The reactor can then be pressurized with hydrogen. Typically the reactor and the polymer latex are heated prior to the first main catalyst component and the secondary water-insoluble catalyst component being added. During such in-situ preparation no organic solvent at all is involved.

In a further embodiment of the present invention the polymer latex is fed into the reactor and degassed as required, and then the catalytically active system is added as an aqueous solution which has been prepared beforehand in-situ but separately by contacting the first main catalyst component of general formula (I) with the secondary water-insoluble catalyst component having either the general formula (II) or the general formula (III). Typically the reactor and the polymer latex are heated prior to the catalyst solution being added.

Or, according to the present invention, an aqueous solution of the catalytically active system which has been prepared beforehand in-situ but separately by contacting the first main catalyst component of general formula (I) with the secondary water-insoluble catalyst component having either the general formula (II) or the general formula (III) is added into the reactor, and then the polymer latex is fed into the reactor and degassed as required. After all materials have been charged to the reactor the reaction mixture is heated to the desired temperature.

The hydrogenation temperature suitable for the present invention is in the range of from 35° C. to 180° C., preferably in the range of from 80° C. to 160° C.

During the course of the hydrogenation reaction the hydrogen may be added to the reactor. The reaction time is from about one quarter of an hour to about 100 hours, depending on operational conditions. The extent to which the carbon-carbon double bonds in the polymer can be hydrogenated is from 80 to 99.5%, preferably from 90 to 99.5%.

When the hydrogenation reaction is carried out to the extent desired, the reaction vessel can be cooled and vented. The resultant hydrogenated latex can be used in latex form if required or be coagulated and washed, to obtain the hydrogenated polymer in solid form.

Hydrogenated nitrile rubbers obtained pursuant to this invention have a Mooney viscosity (ML 1+4 at 100° C.) in the range of from 6 to 150, preferably in the range of from 25 to 100, more preferably in the range of from 35 to 100, and even more preferred in the range of from 39 to 100 and particularly preferred in the range of from 40 to 100.

EXAMPLES

The following examples illustrate the scope of the invention and are not intended to limit the same.

The results clearly show under a number of operating conditions that it is possible to achieve a high degree of hydrogenation.

The materials which were used in the hydrogenation reaction are listed in Table 1.

TABLE 1

Specification of the Materials

| Material | Supplier |
| --- | --- |
| Latex of a butadiene-acrylonitrile polymer (Perbunan ® T 3429) with a solid content in the latex of 14.3 wt %, the polymer containing 66% butadiene and 34% acrylonitrile and having a Mooney viscosity (ML1 + 4 at 100° C.) of about 29; mean diameter of the polymer particles in the latex was about 75 nm | Lanxess Inc. |
| $RhCl_3$ and triphenylphosphine (TPP) (99%) | Strem Chemicals |
| Hydrogen (99.999%) and nitrogen (99.999%) | Praxair |
| Methyl ethyl ketone (99.8%) | Fisher Scientific |

Example 1

Comparison, Only Use of Rhodium Salt (Representing the First Main Catalyst Component), but Absence of Secondary Water-Insoluble Catalyst Component)

A 300 ml glass lined stainless steel autoclave having temperature control means, an agitator and hydrogen gas addition point was used as reactor.

25 ml of the above mentioned latex, 75 ml of water, and 0.012 g of the $RhCl_3.3H_2O$ were charged into the reactor. The latex was then degassed with nitrogen. The temperature was increased to 100° C. and hydrogen was introduced up to 1000 psi (6.8 MPa).

After 4 hours, the hydrogenation degree reaches 23%. Gel was generated and the resultant polymer is partly insoluble in methyl ethyl ketone.

Example 2

Inventive

The same procedures as described in Example 1 were employed. However, 0.013 g of $RhCl_3.3H_2O$ and 0.36 g of $PPh_3$, were used, and 1000 psi (6.8 MPa) of hydrogen pressure and 160° C. was applied.

After 19 hours a 97% hydrogenation degree was achieved. The obtained latex can be coagulated, and the final obtained rubber is gel-free and totally soluble in methyl ethyl ketone.

Example 3

Inventive

The same procedures as described in Example 1 were employed. However, 0.011 g of $RhCl_3.3H_2O$, and 0.36 g of $PPh_3$ were used, and 1000 psi (6.8 MPa) of hydrogen pressure and 160° C. was applied.

After 27 hours a 95% hydrogenation degree was achieved. The obtained latex can be coagulated, and the final obtained rubber is gel-free and totally soluble in methyl ethyl ketone.

Example 4

Inventive

The same experimental setup and NBR latex as described in Example 1 was employed. However, the $RhCl_3.3H_2O$ was pre-mixed with $PPh_3$ before contacting with NBR latex in order to obtain a catalyst solution (the procedures are described below): 0.028 g of $RhCl_3.3H_2O$ was dissolved into 50 ml of de-ionized water in a 200 ml three-neck round bottom flask; The aqueous system was agitated by a magnetic stir bar under $N_2$ and was heated by using an oil bath to at 90° C. with a condenser to reflux the water vapor; After one hour, 0.35 g $PPh_3$ was also added into the system; The system was kept at 90° C. for one hour under agitation, and then was slowly cooled down to room temperature.

20 ml of the above catalyst solution was charged into the high pressure reactor and 25 ml of the NBR latex was also charged with 55 ml of de-ionized water. The whole latex and catalyst system was then degassed with Nitrogen. The temperature was increased to 160° C. and hydrogen was introduced up to 600 psi (4.1 MPa) when 160° C. was reached.

After 24 hours, the hydrogenation degree reaches 98%. The obtained latex can be coagulated, and the final obtained rubber is gel-free and totally soluble in methyl ethyl ketone.

Example 5

Inventive

The same experimental setup and NBR latex as described in Example 1 was employed. However, the $RhCl_3.3H_2O$ was pre-mixed with $PPh_3$ before contacting with NBR latex in order to obtain a catalyst solution (the procedures are described below): 0.013 g of $RhCl_3.3H_2O$ was dissolved into 100 ml of de-ionized water in a 200 ml three-neck round bottom flask; The aqueous system was agitated by a magnetic stir bar under $N_2$ and was heated by using an oil bath to at 90° C. with a condenser to reflux the water vapor; After one hour, 0.35 g $PPh_3$ was also added into the system; The system was kept at 90° C. for one hour under agitation, and then was slowly cooled down to room temperature.

The above catalyst solution was charged into the high pressure reactor and 25 ml of the NBR latex was also charged. The whole latex and catalyst system was then degassed with Nitrogen. The temperature was increased to 160° C. and hydrogen was introduced up to 1000 psi (6.8 MPa) when 160° C. was reached.

After 19 hours, a hydrogenation degree of 97% was reached. The obtained latex can be coagulated, and the final obtained rubber is gel-free and totally soluble in methyl ethyl ketone.

Example 6

Inventive

The same experimental setup and NBR latex as described in Example 1 was employed. However, the $RhCl_3.3H_2O$ was pre-mixed with $PPh_3$ before contacting with NBR latex in order to obtain a catalyst solution (the procedures are described below): 0.013 g of $RhCl_3.3H_2O$ was dissolved into 50 ml of de-ionized water in a 200 ml three-neck round bottom flask; The aqueous system was agitated by a magnetic stir bar under $N_2$ and was heated by using an oil bath to at 90° C. with a condenser to reflux the water vapor; After one hour, 0.35 g $PPh_3$ was also added into the system; The system was kept at 90° C. for one hour under agitation before adding 25 ml latex; After another one hour at 90° C., the whole system was slowly cooled down to room temperature.

The above system was charged into the high pressure reactor and 25 ml of de-ionized water was also charged. The whole latex and catalyst system was then degassed with Nitrogen. The temperature was increased to 160° C. and hydrogen was introduced up to 1000 psi (6.8 MPa) when 160° C. was reached.

After 8 hours, the hydrogenation degree reaches 92%. The obtained latex can be coagulated, and the final obtained rubber is gel-free and totally soluble in methyl ethyl ketone.

TABLE 2

Experimental Conditions for Examples of Hydrogenation of Nitrile-Butadiene Rubber in Latex Form

| Example | Latex [ml] | Water [ml] | Salt used | $W_{cat}$ [g] | $PPh_3$ [g] | $P_{H2}$ [MPa] | T [° C.] | Hydrogen. Time [h] | HD[1] [%] |
|---|---|---|---|---|---|---|---|---|---|
| 1** | 25 | 75 | $RhCl_3 \cdot 3H_2O$ | 0.012 | — | 6.8 | 100 | 4 | GEL |
| 2 | 25 | 75 | $RhCl_3 \cdot 3H_2O$ | 0.013 | 0.36 | 6.8 | 160 | 19 | 97 |
| 3 | 25 | 75 | $RhCl_3 \cdot 3H_2O$ | 0.011 | 0.36 | 6.8 | 160 | 27 | 95 |
| 4* | 25 | 75 | $RhCl_3 \cdot 3H_2O$ | 0.011 | 0.14 | 4.1 | 160 | 24 | 98 |
| 5* | 25 | 100 | $RhCl_3 \cdot 3H_2O$ | 0.013 | 0.35 | 6.8 | 160 | 19 | 97 |
| 6* | 25 | 75 | $RhCl_3 \cdot 3H_2O$ | 0.013 | 0.35 | 6.8 | 160 | 8 | 92 |

*aqueous solution of $RhCl_3 \cdot 3H_2O$ was pre-mixed with $PPh_3$ before contacting with latex
**comparison
[1]HD = hydrogenation degree Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for selectively hydrogenating carbon-carbon double bonds in a diene-based polymer comprising subjecting the diene-based polymer which is present in latex form to a hydrogenation which is performed in the absence of any organic solvent and by contacting it with a catalytically active system based on a first main catalyst component having the general formula (I)

$$MQ_x \cdot aH_2O \quad (I)$$

wherein

M is a group VIII transition noble metal,

Q is identical or different, and a hydride or an anion other than a hydride, x is 1, 2, or 3, and a is in the range of from 0 to 3 and on a secondary water-insoluble catalyst component having either the general formula (II) or the general formula (III)

$$R^1{}_mB \quad (II)$$

$$R^2{}_2C\text{-}A\text{-}CR^2{}_2 \quad (III)$$

in which $R^1$ is identical or different and represents hydrogen, alkyl, aryl, cycloalkyl, or aralkyl, B is phosphorus, nitrogen, arsenic, sulfur, or a sulphoxide group S=O, and m is 2 or 3, $R^2$ is identical or different and represents hydrogen, alkyl, aryl, cycloalkyl, or aralkyl, C is phosphorus, or arsenic, A represents either a single bond or a spacer group wherein such catalytically active system is prepared in-situ.

2. The process according to claim 1, wherein the catalytically active system is either formed (i) by contacting the first main catalyst component having the general formula (I) with the secondary water-insoluble catalyst component having either the general formula (II) or (III) beforehand in an aqueous solution and then without isolating the catalytically active species contacting such catalytically active solution with the diene-based polymer to be hydrogenated and present in latex form or (ii) by adding and thereby contacting the first main catalyst component having the general formula (I) with the secondary water-insoluble catalyst component having either the general formula (II) or (III) directly in the latex containing the diene-based polymer to be hydrogenated, wherein during such in-situ preparation no organic solvent is involved.

3. The process according to claim 1, wherein the secondary water-insoluble catalyst component has the general formula (II) in which $R^1$ is identical or different and represents hydrogen, $C_1$-$C_8$-alkyl, $C_6$-$C_{15}$-aryl, $C_4$-$C_8$-cycloalkyl, or $C_7$-$C_{15}$-aralkyl, B is phosphorus or nitrogen, and m is 3, or the secondary water-insoluble catalyst component has the general formula (III) in which $R^2$ is identical or different and represents hydrogen, $C_1$-$C_8$-alkyl, $C_6$-$C_{15}$-aryl, $C_4$-$C_8$-cycloalkyl, or $C_7$-$C_{15}$-aralkyl, and A represents 1,4-phenylene or a $C_1$-$C_8$-alkylene group or a single bond.

4. The process according to claim 2, wherein the secondary water-insoluble catalyst component has the general formula (II) in which $R^1$ is identical or different and represents hydrogen, $C_1$-$C_8$-alkyl, $C_6$-$C_{15}$-aryl $C_4$-$C_8$-cycloalkyl, or $C_7$-$C_{15}$-aralkyl, B is phosphorus or nitrogen, and m is 3, or the secondary water-insoluble catalyst component has the general formula (III) in which $R^2$ is identical or different and represents hydrogen, $C_1$-$C_8$-alkyl, $C_6$-$C_{15}$-aryl, $C_4$-$C_8$-cycloalkyl, or $C_7$-$C_{15}$-aralkyl, and A represents 1,4-phenylene or a $C_1$-$C_8$-alkylene group or a single bond.

5. The process according to claim 1, wherein the secondary water-insoluble catalyst component pursuant to general formula (II) is selected from the group consisting or triaryl-, trialkyl-, tricycloalkyl-, diaryl monoalkyl-, dialkyl monoaryl-, diaryl monocycloalkyl-, dialkyl monocycloalkyl-, dicycloalkyl monoaryl- and dicycloalkyl monoaryl phosphines.

6. The process according to claim 1, wherein a first main catalyst component pursuant to the general formula (I) is used in which M represents rhodium, ruthenium, osmium or iridium, Q represents hydrogen or a halide, and x is 1, 2, or 3, in particular 3, when 0 is a halide and a is in the range of from 0 to 3.

7. The process according to claim 1, wherein the in-situ preparation of the catalytically active system results in catalytically active species selected from the group consisting of tris-(triphenylphosphine)-rhodium(I)-chloride, tris-(triphenylphosphine)-rhodium(III)-trichloride, tris-(dimethylsulphoxide)rhodium(III)-trichloride, tetrakis-(triphenylphosphine)-rhodium(I) hydride, the corresponding compounds in which triphenylphosphine moieties are replaced by tricyclohexylphosphine, OsHCl(CO)(PCy$_3$)$_2$ and OsHCl(CO)[P(isopropyl)$_3$]$_2$.

8. The process according to claim 1, wherein RhCl$_3$.3H$_2$O is used as first main catalyst component and PPh$_3$ as secondary catalyst component.

9. The process according to claim 1, in which the first main catalyst component is used in an amount in the range of from 0.01% b.w. to 5.0% b.w., based on the weight of the polymer solid content of the latex and the secondary catalyst component is used in quantities in the range of from 0.1% b.w. to 50% b.w. based on the weight of the polymer solid content of the latex.

10. The process according to claim 1, wherein the carbon-carbon double bonds containing polymer subjected to the hydrogenation comprises repeating units of at least one conjugated diene as monomer (a) and at least one further copolymerizable monomer (b).

11. The process according to claim 10, wherein monomers (b) selected from the group consisting of olefins, vinylaromatic monomers, vinylesters of aliphatic or branched C$_1$-C$_{18}$ monocarboxylic acids, or mixtures thereof.

12. The process according to claim 10, wherein an aqueous dispersion of a copolymer of 1,3-butadiene and styrene or alpha-methylstyrene is subjected to hydrogenation.

13. The process according to claim 10, wherein monomers (b) are selected from the group consisting of ethylenically unsaturated mono- or dicarboxylic acids, esters of ethylenically unsaturated mono- or dicarboxylic acids, are used.

14. The process according to claim 10, wherein as monomers (b) are α,β-unsaturated nitriles.

15. The process according to claim 10, wherein an aqueous dispersion of a nitrile rubber ("NBR"), comprising a copolymer of an α,β-unsaturated nitrile, and a conjugated diene, and optionally at least one further copolymerizable monomer, their esters or amides is subjected to hydrogenation.

16. The process according to claim 14, wherein an aqueous dispersion of a terpolymer of acrylonitrile, 1,3-butadiene and a third monomer selected from the group consisting of fumaric acid, maleic acid, acrylic acid, methacrylic acid, n-butyl acrylate and tert-butyl acrylate is subjected to hydrogenation.

17. The process according to claim 1, in which the polymer solid content in the aqueous dispersion lies in the range of from 1 to 75% by weight, based on the total weight of the aqueous dispersion.

18. The process according to claim 1, which is carried out at a hydrogenation temperature in the range of from 35° C. to 180° C. and at a pressure of from 0.1 to 20 MPa.

19. The process according to claim 1, wherein M is a group VIII transition noble metal selected from the group consisting of rhodium, ruthenium, osmium or iridium.

20. The process according to claim 1 wherein A represents either a single bond or a spacer group selected from the group consisting of phenylene or a —(CH$_2$)$_n$— group with n being an integer from 1 to 20.

21. The process according to claim 3 wherein R$^1$ is identical or different and represents phenyl or cyclohexyl.

22. The process according to claim 4, wherein the secondary water-insoluble catalyst component has the general formula (II) in which R$^1$ is identical or different and represents phenyl or cyclohexyl.

23. The process according to claim 6, wherein a first main catalyst component pursuant to the general formula (I) is used in which Q is selected from the group containing a chloride or bromide ion and x is 3 when Q is a halide and a is in the range of from 0 to 3.

24. The process according to claim 11 wherein the olefins are selected from the group consisting of ethylene or propylene.

25. The process according to claim 11 wherein the vinylaromatic monomers are selected from the group consisting of styrene, alpha-methyl styrene, o-chlorostyrene or vinyltoluenes.

26. The process according to claim 11 wherein the vinylesters of aliphatic or branched C$_1$-C$_{18}$ monocarboxylic acids are selected from the group consisting of vinyl acetate, vinyl propionate, vinyl butyrate, vinyl valerate, vinyl hexanoate, vinyl 2-ethylhexanoate, vinyl decanoate, vinyl laurate and vinyl stearate.

27. The process according to claim 13 wherein the ethylenically unsaturated mono- or dicarboxylic acids are selected from the group consisting of acrylic acid, methacrylic acid, maleic acid, fumaric acid and itaconic acid.

28. The process according to claim 13 wherein the esters of ethylenically unsaturated mono- or dicarboxylic acids are selected from the group containing acrylic acid, methacrylic acid, maleic acid, fumaric acid and itaconic acid with C$_1$-C$_{12}$ alkanols.

29. The process according to claim 28 wherein the esters are selected from the group consisting of methyl methacrylate, n-butyl methacrylate, tert-butyl methacrylate, n-butyl acrylate, tert-butyl acrylate, and 2-ethylhexyl acrylate.

30. The process according to claim 14 where the α,β-unsaturated nitrile is acrylonitrile, methacrylonitrile, ethacrylonitrile or mixtures thereof are used.

31. The process according to claim 15 wherein the α,β-unsaturated nitrile is acrylonitrile and the conjugated diene is 1,3-butadiene.

* * * * *